(12) United States Patent
Welschholz

(10) Patent No.: US 8,375,655 B1
(45) Date of Patent: Feb. 19, 2013

(54) CARPORT FOR A MOTOR VEHICLE

(75) Inventor: Joerg Welschholz, Herscheid (DE)

(73) Assignee: Leopold Kostal GmbH & Co. KG, Leudenscheid (DE)

( * ) Notice: Subject to any disclaimer, the term of this patent is extended or adjusted under 35 U.S.C. 154(b) by 0 days.

(21) Appl. No.: 13/553,876

(22) Filed: Jul. 20, 2012

(30) Foreign Application Priority Data

Aug. 19, 2011 (DE) .......................... 10 2011 111 031

(51) Int. Cl.
*E04D 13/18* (2006.01)
*E04H 14/00* (2006.01)
*E04B 1/34* (2006.01)

(52) U.S. Cl. .............................. 52/173.3; 52/73; 52/79.1

(58) Field of Classification Search .............. 52/73, 79.1, 52/173.3; 136/251, 246; 320/101, 109
See application file for complete search history.

(56) References Cited

U.S. PATENT DOCUMENTS

| | | | | |
|---|---|---|---|---|
| 3,105,929 A * | 10/1963 | Blue | .............................. | 320/109 |
| 5,315,227 A * | 5/1994 | Pierson et al. | ................. | 320/101 |
| 5,847,537 A * | 12/1998 | Parmley, Sr. | ................... | 320/109 |
| 5,855,262 A * | 1/1999 | Jackson | ........................ | 191/12.4 |
| 7,531,741 B1 * | 5/2009 | Melton et al. | .................. | 136/246 |
| 8,013,569 B2 * | 9/2011 | Hartman | ........................ | 320/109 |
| 8,143,841 B2 * | 3/2012 | Gochenaur | .................... | 320/101 |
| 2008/0216418 A1 | 9/2008 | Durham | | |
| 2009/0050194 A1 * | 2/2009 | Noble et al. | ................... | 136/251 |
| 2010/0000165 A1 * | 1/2010 | Koller | ........................... | 52/173.3 |
| 2010/0275975 A1 * | 11/2010 | Monschke et al. | ............ | 136/251 |
| 2011/0187310 A1 * | 8/2011 | Gochenaur | .................... | 320/101 |
| 2011/0290305 A1 * | 12/2011 | Hoffmann et al. | ............ | 136/251 |

FOREIGN PATENT DOCUMENTS

| | | |
|---|---|---|
| DE | 102005020995 A1 | 11/2006 |
| DE | 102007063450 A1 | 7/2009 |
| DE | 202009012242 U1 | 12/2009 |
| DE | 202010011033 U1 | 11/2010 |
| DE | 102010018917 A1 | 12/2010 |
| DE | 102010003148 A1 | 9/2011 |
| EP | 2175089 A2 | 4/2010 |
| EP | 22292877 A1 | 3/2011 |

* cited by examiner

*Primary Examiner* — Mark Wendell
(74) *Attorney, Agent, or Firm* — Brooks Kushman P.C.

(57) ABSTRACT

A carport for a vehicle includes a roof, a concrete foundation, and a battery charging station. The roof is mounted to the concrete foundation via at least one support. The concrete foundation has a storage area therein. The charging station has a component for charging a battery of an electric vehicle parked underneath the roof next to the concrete foundation. The component of the charging station is positioned within the storage area of the concrete foundation.

18 Claims, 2 Drawing Sheets

CARPORT FOR A MOTOR VEHICLE

CROSS-REFERENCE TO RELATED APPLICATIONS

This application claims foreign priority benefits under 35 U.S.C. §119(a)-(d) to DE 10 2011 111 031.7, filed Aug. 19, 2011; the disclosure of which is incorporated in its entirety by reference herein.

TECHNICAL FIELD

The present invention relates to a carport having a roof mounted to a concrete foundation and a charging station configured to charge the traction battery of an electric vehicle parked in the carport.

BACKGROUND

Carports are free standing buildings having a roof. The roof of a carport protects vehicles parked in the carport from weather conditions. The outer side of the roof can accommodate solar cells thereon. The photovoltaic current produced by the solar cells can directly charge the traction battery of an electric vehicle parked in the carport or can be fed into the public grid.

DE 10 2010 018 917 A1 describes a carport having a roof held up by supports connected to concrete strip foundations. The supports form an aluminum or steel structural framework. Solar modules for producing photovoltaic current are on the outer side of the roof. The carport includes an electrical dispenser provided as an enhancement.

SUMMARY

An object of the present invention includes a carport having a roof, a concrete foundation, and a battery charging station with the roof being mounted to the concrete foundation and the charging station being configured to charge an electric vehicle parked underneath the roof next to the concrete foundation in which the charging station is integrated in the concrete foundation such that the charging of the electric vehicle can be carried out securely and readily and such that the charging station is protected from weather conditions and unauthorized access.

In carrying out at least one of the above and other objects, a carport for a vehicle is provided. The carport includes a roof, a concrete foundation, and a battery charging station. The roof is mounted to the concrete foundation via at least one support. The concrete foundation has a storage area therein. The charging station has a component for charging a battery of an electric vehicle parked underneath the roof next to the concrete foundation. The component of the charging station is positioned within the storage area of the concrete foundation.

Further, in carrying out at least one of the above and other objects, another carport for a vehicle is provided. This carport also includes a roof, a concrete foundation, and a battery charging station. The roof is mounted to the concrete foundation via at least one support. The concrete foundation has individual storage areas therein. Each storage area is a hollow cavity of the concrete foundation having concrete walls and an exposed side. The charging station has components for charging a battery of an electric vehicle parked underneath the roof next to the concrete foundation. The components of the charging station are located within respective ones of the storage areas of the concrete foundation.

The components of the charging station may include a charging coupler and one or more storage batteries. The charging coupler is movably connected to the storage area of the concrete foundation such that the charging coupler is movable between a retracted position in which the charging coupler is positioned within the storage area and a retracted position in which the charging coupler is positioned out of the storage area. The one or more storage batteries are located within respective ones of the storage areas of the concrete foundation. The charging station may further include a solar module configured to generate electric energy. The solar module is arranged on the roof and is connected to at least one of the components of the charging station.

Embodiments of the present invention are directed to a carport having a roof, a concrete foundation, and a battery charging station. The roof is held up by one or more supports which mount the roof to the concrete foundation. The supports may be connected to the concrete foundation and the roof such that the roof is cantilevered. The charging station is configured to charge the traction battery of an electrically powered vehicle parked in the carport. Solar modules may be arranged on the outer side of the roof to produce photovoltaic current for the charging station.

The concrete foundation includes one or more hollow cavities in the form of storage bins, storage lockers, etc., (i.e., "storage areas"). Components of the charging station are accommodated by the storage areas formed in the concrete foundation. The storage areas of the concrete foundation may include a supporting element such as a shelf. Components of the charging station are located within respective ones of the storage areas and are supported by the supporting elements of the storage areas. For instance, components of the charging station are positioned on shelves of the corresponding storage areas.

The concrete foundation may be formed as an upright concrete foundation. The concrete foundation may have one or more prefabricated elements.

A carport in accordance with embodiments of the present invention is suited for containing a battery charging station configured for inductive charging of the traction battery of an electric vehicle parked in the carport. A carport in accordance with embodiments of the present invention is also suited for containing a battery charging station configured for galvanically coupled traction batteries. Such a charging station can provide conductively coupled charging of the traction battery of an electric vehicle parked in the carport via a charging cable having a connector part.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
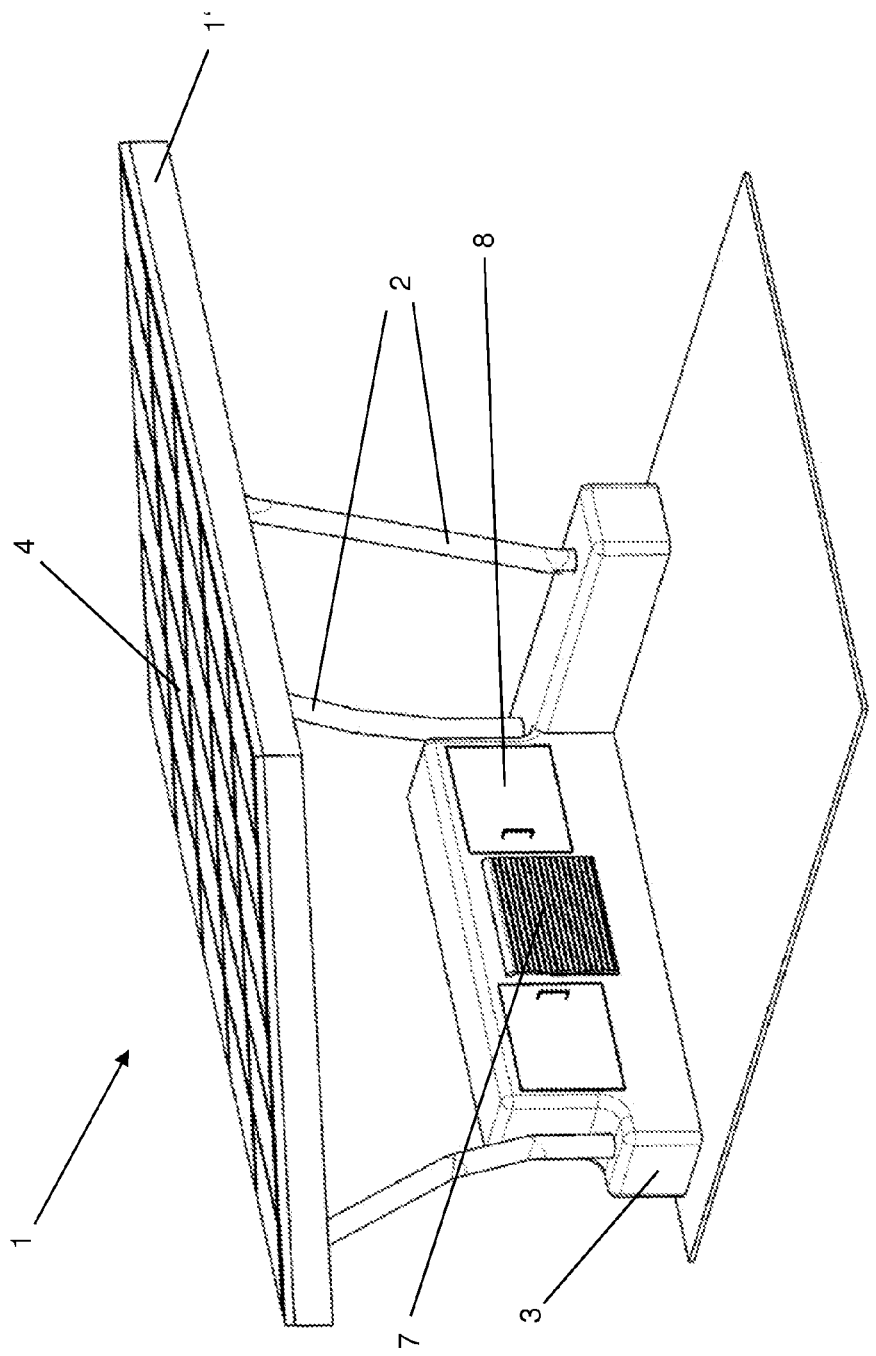
FIG. 1 illustrates a view of a carport in accordance with an embodiment of the present invention.
Figure 2:
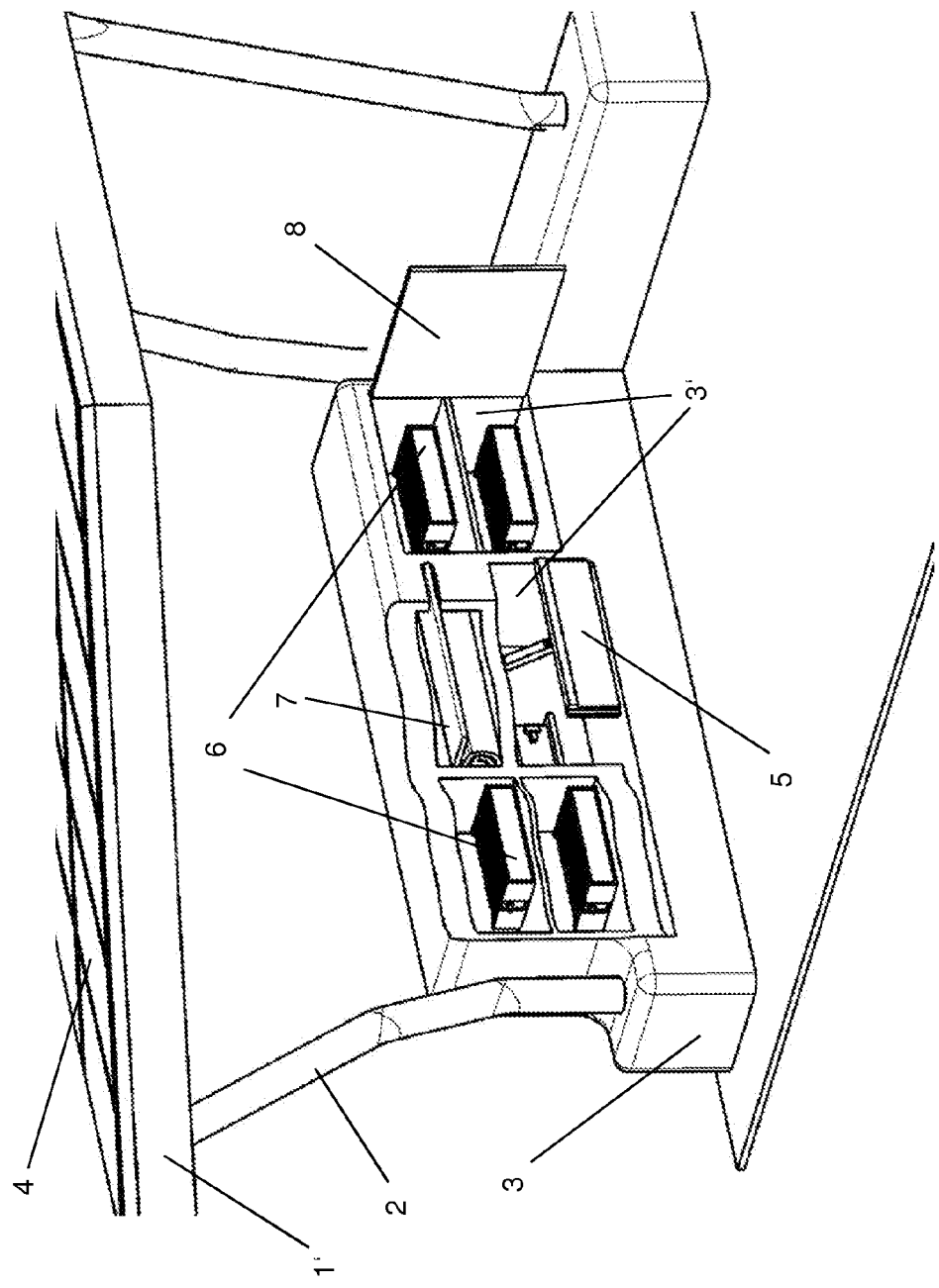
FIG. 2 illustrates a detailed enlargement view of the carport with the storage areas of the concrete foundation exposed.

Referring now to FIGS. 1 and 2, a carport in accordance with an embodiment of the present invention is shown. The carport includes a roof 1, a concrete foundation 3, and a battery charging station. The carport is configured to accommodate a vehicle parked therein. A vehicle parked in the carport would be located underneath roof 1 and adjacent to concrete foundation 3.

The charging station is configured to charge the traction battery of an electric vehicle parked in the carport. As described below, the charging station includes various components used to charge the electric vehicle. The charging station components include a charging coupler 5. The charging station components may further include solar modules 4 and storage batteries 6. Other charging station components include a control unit, inverters, etc.

Roof 1 is held up and supported by supports 2 mounted to concrete foundation 3. Supports 2 are connected between roof 1 and concrete foundation 3 such that roof 1 has a cantilevered form. Supports 2 can be made of structural steel or aluminum. Supports 2 can also be made of other materials such as wood, carbon fiber composites, suitable plastics, and the like.

Roof 1 includes a support structure such as a roof frame 1'. Roof frame 1' is configured to support solar modules 4. Solar modules 4 are arranged on the upper side of roof frame 1' and are configured to produce photovoltaic current.

Concrete foundation 3 has an upright structure as shown in FIGS. 1 and 2. As such, concrete foundation 3 may be formed as an upright concrete foundation. Concrete foundation 3 rests on a suitable level surface associated with the carport. At least part of concrete foundation 3 may be located underneath roof 1. In an embodiment, the entire concrete foundation 3 is located underneath roof 1. Concrete foundation 3 may be formed from one or more prefabricated elements.

Concrete foundation 3 includes one or more storage areas 3'. Storage areas 3' are individually formed as hollow cavities of concrete foundation 3. Storage areas 3' are configured to accommodate therein components of the charging station. Such components of the charging station are used to charge the traction battery of an electric vehicle parked in the carport.

Storage areas 3' of concrete foundation 3 are also configured to accommodate therein batteries 6. Batteries 6 are configured to receive and store electrical energy from solar modules 4. Batteries 6 are further configured to provide the stored electrical energy to the charging system for the charging system to use in charging electric vehicles.

Storage areas 3' of concrete foundation 3 may include a supporting element such as a shelf. The shelf of a storage area 3' may be movable or fixed and defines the bottom of the storage area. The shelves may be formed as part of concrete foundation 3 and thereby made of concrete. In this case, the shelves are likely to be fixed in place. Alternatively, the shelves may be components formed separate from the concrete foundation and made of materials such as wood, plastic, etc. In this case, the shelves are likely to be movable in and out of the corresponding storage areas 3'. Components of the charging station are located within respective ones of storage areas 3' and positioned on the shelves of storage areas 3'.

Storage areas 3' of concrete foundation 3 have corresponding access through holes for wiring and the like to extend into and out of storage areas 3' and between adjacent storage areas 3'. As described, certain components of the charging station used to charge an electric vehicle parked in the carport are placed within corresponding storage areas 3'. Such components include charging coupler 5 and batteries 6. Charging coupler 5, which is located in one storage area 3', is hardwired connected to batteries 6, which are respectively located in other storage areas 3'. The hardwire connections between charging coupler 5 and batteries 6 runs through corresponding access through holes of storage areas 3'. Similarly, charging coupler 5 is hardwired connected to solar modules 4. This hardwire connection runs between solar modules 4 and charging coupler 5 along one of supports 2 and extends through an access through hole of storage area 3' accommodating charging coupler 5.

Another component of the charging station is a control unit. The control unit may be part of charging coupler 5. The control unit controls the overall operation of the charging station. As described, the operation of the charging station includes charging an electric vehicle directly with electric energy from solar modules 4, charging an electric vehicle with electric energy from batteries 6, recharging batteries 6 with electric energy from solar modules 4, and the like.

An example of the charging station as shown in FIGS. 1 and 2 is a charging station for inductive charging of a traction battery of an electric vehicle parked in the carport. A component of such a charging station is a charging coupler 5 attachable to an electric vehicle parked in the carport. Charging coupler 5 is attachable to the vehicle with a first transformer part. Electrical energy from the charging station is transferred through the first transformer part to a second transformer part located on the vehicle. The second transformer part of the vehicle is located behind its front license plate. The vehicle is parked in the carport close to concrete foundation 3 with the front end of the vehicle being positioned near the corresponding portion of concrete foundation 3 in order to enable charging coupler 5 to attach to the vehicle for charging the traction battery of the vehicle. Charging coupler 5 is itself adjustable in spatial directions by a motor so that charging coupler 5 can be precisely positioned with respect to the license plate area of the front end of the vehicle in order to couple the two transformer parts of the charging station and the vehicle with one another.

When no charging process is underway, charging coupler 5 is retracted into a storage area 3' of concrete foundation 3. Storage area 3' for coupler 5 is covered outwardly by a rolling shutter 7. Other storage areas 3' may also have corresponding rolling shutters. Rolling shutter 7 seals storage area 3' for charging coupler 5 thereby offering protection to charging coupler 5 against weathering effects, unauthorized use, and vandalism. In order to initiate a charging process, rolling shutter 7 can, for example, be opened with a motor by a remote control signal. The remote control signal may be integrated with an authorization checking feature. Storage areas 3' that can be closed by a rolling shutter can also be used to store additional components of the charging station, such as, for example, a high-frequency inverter for operating the transformer part on the charging station side, in addition to charging coupler 5.

As described above, batteries 6 are placed in additional storage areas 3' of concrete foundation 3. Batteries 6 are configured to receive and store electrical energy from solar modules 4 and to provide the stored electrical energy to the charging system for the charging system to use in charging electric vehicles. As such, batteries 6 act as intermediate storage for electrical energy used to charge vehicles as part of an intelligent energy management system. Thus, during the charging of the traction battery of an electric vehicle, the current produced by solar cells 4 on roof 1 is used initially. If this energy is not available or is insufficient due to the absence or momentary shortfall of solar radiation to enable optimal charging, then the electrical energy stored in batteries 6 of the charging station is used to supplement the battery charging. Batteries 6 are recharged by the current produced by solar cells 4 at times during which no vehicle battery is being charged.

Storage areas 3' of concrete foundation 3 that contain batteries 6 are enclosed by doors 8 that open outwardly. Doors 8 also offer protection against weathering effects, unauthorized use, and vandalism.

A carport in accordance with embodiments of the present invention can thus include a completely self-contained charging station that is independent of any link to a public or private network. If one or another such network is available, then a connection to the network can be provided. The concept of intelligent energy management can be extended in order include the possibilities offered for using electrical energy for devices in a household, energy input into the public grid, and the supply of energy from this network.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A carport for a vehicle, the carport comprising:
a concrete foundation having a storage area therein, the concrete foundation resting on a carport surface configured to support a vehicle thereon and the storage area is above the carport surface, wherein the storage area is a hollow cavity of the concrete foundation having concrete walls and an exposed side;
a roof mounted over at least part of the concrete foundation via at least one support; and
a charging station having a component for charging a battery of an electric vehicle parked on the carport surface underneath the roof next to the concrete foundation, wherein the component of the charging station is positioned within the storage area of the concrete foundation.

2. The carport of claim 1 wherein:
the component of the charging station is a charging coupler.

3. The carport of claim 1 wherein:
the charging station further includes a solar module configured to generate electric energy, wherein the solar module is arranged on the roof and is connected to the component of the charging station.

4. The carport of claim 3 wherein:
the solar module is connected to the component of the charging station via wiring running along one of the supports.

5. The carport of claim 3 wherein:
the component of the charging station is one of a charging coupler and a storage battery.

6. The carport of claim 1 wherein:
the concrete foundation includes a plurality of storage areas therein;
the charging station includes a plurality of components for charging a battery of an electric vehicle parked underneath the roof next to the concrete foundation, wherein the components of the charging station are positioned within respective ones of the storage areas of the concrete foundation.

7. The carport of claim 6 wherein:
the components of the charging station are connected to one another within the concrete foundation via access points extending between adjacent storage areas of the concrete foundation.

8. The carport of claim 7 wherein:
each storage area of the concrete foundation is a hollow cavity of the concrete foundation.

9. The carport of claim 7 wherein:
the charging station further includes a solar module configured to generate electric energy, wherein the solar module is arranged on the roof and is connected to at least one of the components of the charging station.

10. The carport of claim 9 wherein:
the components of the charging station include a charging coupler and one or more storage batteries.

11. The carport of claim 1 wherein:
the concrete foundation is as an upright concrete foundation.

12. The carport of claim 11 wherein:
the concrete foundation includes at least one prefabricated element.

13. The carport of claim 1 wherein:
the roof is mounted to the concrete foundation such that the roof is cantilevered.

14. A carport for a vehicle, the carport comprising:
a concrete foundation having a storage area therein;
a roof mounted to the concrete foundation via at least one support; and
a charging station having a component for charging a battery of an electric vehicle parked underneath the roof next to the concrete foundation, wherein the component of the charging station is positioned within the storage area of the concrete foundation;
wherein the storage area of the concrete foundation is a hollow cavity of the concrete foundation having concrete walls and an exposed side;
wherein the storage area of the concrete foundation includes a closure member movable between a closed position and an opened position, wherein in the closed position the closure member closes the exposed side of the storage area, wherein in the opened position the closure member opens the exposed side of the storage area.

15. The carport of claim 14 wherein:
the closure member is a rolling shutter.

16. A carport for a vehicle, the carport comprising:
a concrete foundation having a plurality of individual storage areas therein, each storage area being a hollow cavity of the concrete foundation having concrete walls and an exposed side;
a roof mounted to the concrete foundation via at least one support; and
a charging station having a plurality of components for charging a battery of an electric vehicle parked underneath the roof next to the concrete foundation, wherein the components of the charging station are located within respective ones of the storage areas of the concrete foundation;
wherein each storage area of the concrete foundation is a hollow cavity of the concrete foundation having concrete walls and an exposed side;
wherein at least one of the storage areas of the concrete foundation includes a closure member movable between a closed position and an opened position, wherein in the closed position the closure member closes the exposed side of the at least one of the storage areas, wherein in the opened position the closure member opens the exposed side of the at least one of the storage areas.

17. The carport of claim 16 wherein:

the components of the charging station include a charging coupler and one or more storage batteries;

wherein the charging coupler is movably connected to one of the storage areas of the concrete foundation such that the charging coupler is movable between a retracted position in which the charging coupler is positioned within the one of the storage areas and a retracted position in which the charging coupler is positioned out of the one of the storage areas;

wherein the one or more storage batteries are located within respective ones of the storage areas of the concrete foundation.

18. The carport of claim 17 wherein:

the charging station further includes a solar module configured to generate electric energy, wherein the solar module is arranged on the roof and is connected to at least one of the components of the charging station.

* * * * *